United States Patent [19]
Robertson

[11] Patent Number: 5,887,100
[45] Date of Patent: Mar. 23, 1999

[54] OPTICAL FIBRE CONNECTOR DEVICE

[75] Inventor: Bruce Elphinston Robertson, Glen Waverly, Australia

[73] Assignee: Kingfisher International Pty. Ltd., Victoria, Australia

[21] Appl. No.: 855,513

[22] Filed: May 13, 1997

[30] Foreign Application Priority Data

May 14, 1996 [AU] Australia ............................ PN9808/96

[51] Int. Cl.$^6$ ..................................................... G02B 6/36
[52] U.S. Cl. ................................. 385/76; 385/77; 385/78; 385/70; 385/72; 385/139
[58] Field of Search ................................ 385/53, 54, 55, 385/56, 70, 72, 76, 77, 78, 139

[56] References Cited

U.S. PATENT DOCUMENTS

| | | | |
|---|---|---|---|
| 4,611,887 | 9/1986 | Glover et al. .......................... | 385/72 X |
| 4,762,389 | 8/1988 | Kaihara .................................. | 385/72 X |
| 4,902,094 | 2/1990 | Shank .................................... | 385/76 X |
| 5,101,463 | 3/1992 | Cubukciyan et al. .................... | 385/72 |
| 5,129,023 | 7/1992 | Anderson ................................ | 385/70 |
| 5,159,652 | 10/1992 | D'Alphonse et al. ................... | 385/56 |
| 5,333,221 | 7/1994 | Briggs et al. ............................. | 385/55 |
| 5,420,951 | 5/1995 | Marazzi et al. .......................... | 385/75 |
| 5,481,634 | 1/1996 | Anderson et al. ....................... | 385/76 |
| 5,692,080 | 11/1997 | Lu ........................................... | 385/60 |

FOREIGN PATENT DOCUMENTS

| | | | |
|---|---|---|---|
| 0 156 397 A2 | 3/1985 | European Pat. Off. ............. | 385/76 X |
| 85103847.1 | 3/1985 | European Pat. Off. . | |
| 0 462 907 A1 | 6/1991 | European Pat. Off. ............. | 385/78 X |
| 0 616 236 A1 | 11/1993 | European Pat. Off. ............. | 385/78 X |
| 9222742.0 | 10/1992 | United Kingdom ................ | 385/56 X |
| 2 261 742 | 5/1993 | United Kingdom ................ | 385/76 X |

*Primary Examiner*—Brian Healy
*Attorney, Agent, or Firm*—Wells, St. John, Roberts, Gregory & Matkin, P.S.

[57] ABSTRACT

An optical fibre device, including an optical connector disposed therein, a recess allowing a through connector to be connected to the optical connector, and an engagement mechanism which enables release of the through connector when connected to the optical connector.

14 Claims, 9 Drawing Sheets

OPTICAL FIBRE CONNECTOR DEVICE

FIELD OF THE INVENTION

The present invention relates to an optical fibre device and to an optical fibre connector system.

BACKGROUND OF THE INVENTION

The fibre optic communications industry currently uses a number of different optical fibre connector types. The connectors are used to interconnect and disconnect, optical fibres used for light transmission. To provide a satisfactory connection requires optical connectors to be high precision mechanical devices, with tolerances on certain parts being in the order of 1 micron. The connectors are difficult to produce and many years of engineering effort have been required to perfect and develop the various types of connectors, most of which need to be manufactured in large quantities. The different types of connectors are essentially all incompatible, and as the industry evolves, new types are being developed with improved characteristics. Despite the variety of types of connectors which are available, there is a lack of user installable and inexpensive components for adapting between connector types. A number of adaptors for connecting different types of connectors are available but tend to be severely limited in application, either due to excessive cost or limited performance. Some adaptors are used in insets or equipment, but are incorporated into instruments, so an instrument can only be used to connect to one type of connector. The user purchasing the instrument therefore can only make use of it with one type of optical connector.

SUMMARY OF THE INVENTION

In accordance with the present invention there is provided an optical fibre device, including an optical connector disposed therein, a recess allowing a through connector to be connected to said optical connector, and an engagement mechanism which enables release of said through connector when connected to said optical connector.

The present invention further includes an optical fibre connector system, including:

a device with an optical connector disposed therein;

a through connector connectable to said connector; and an engagement mechanism which enables release of said through connector when connected to said connector.

BRIEF DESCRIPTION OF THE DRAWINGS

Preferred embodiments of the present invention are hereinafter described, by way of example only, with reference to the accompanying drawings, wherein.

DETAILED DESCRIPTION OF THE PREFERRED EMBODIMENTS

Figure 1:
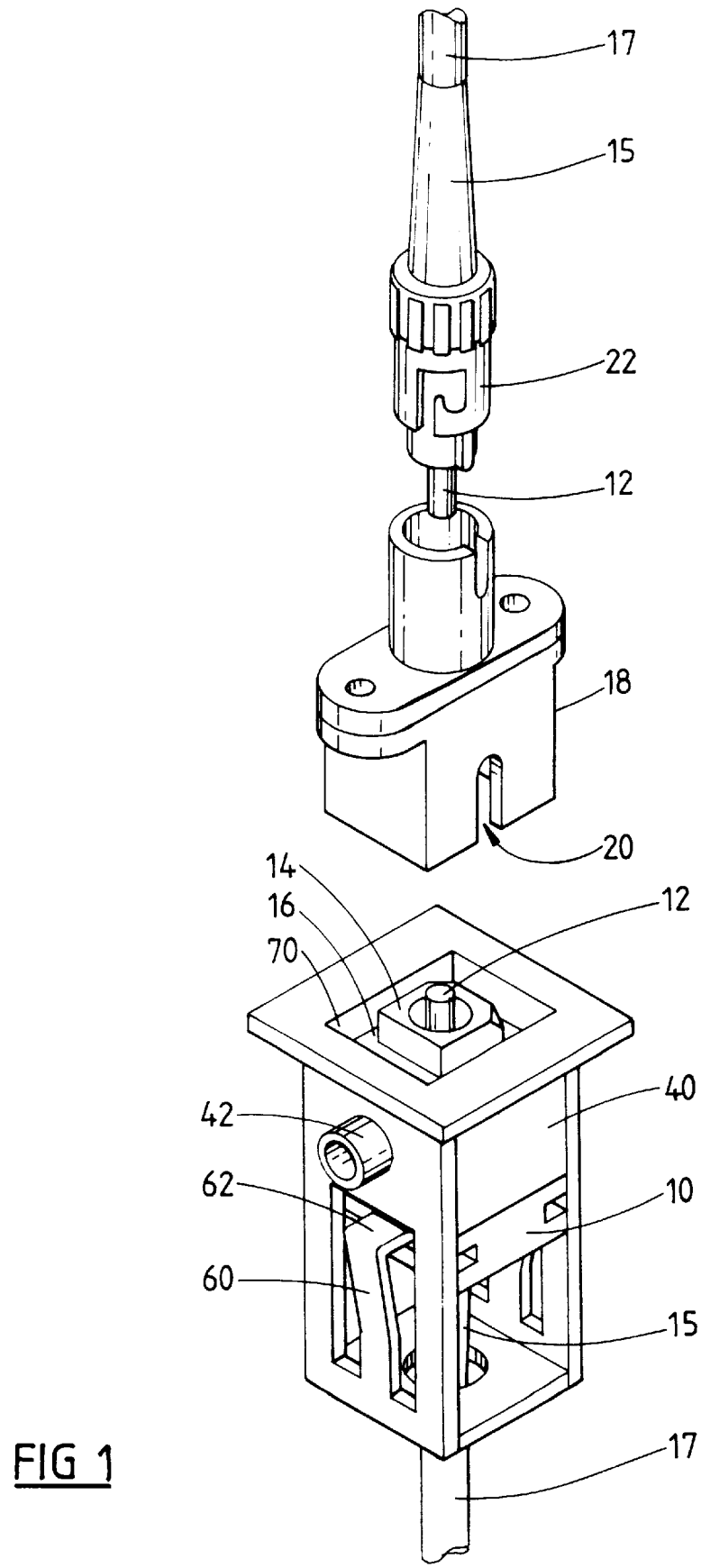
FIG. 1 is an exploded schematic view of a connector support of an instrument of a first preferred embodiment, with a through connector and an optical connector.

Optical fibres connectors are made according to a number of different designs, which although incompatible, have similar characteristics. Standard connector types include, for example, ST, SC, FC, D4, LSA, E2000, EC and SMA, which are made by a number of manufacturers. The connectors are used to make a connection between two fibres, and are positioned on the ends of an optical fibre, with the fibre tip being polished to provide a desired interconnecting surface. As shown in FIG. 1 for an SC connector 10, the fibre tip is fixed in a ferrule 12 which provides precise physical positioning of the fibre. The ferrule 12 is normally round with an outside diameter of 2.5 mm and inside diameter which matches the diameter of the fibre, which is normally about 125 microns.

The ferrule 12 is normally mounted within a sleeve 14 which has at the opposite end a part affixed thereto, often referred to as the boot 15, which supports the outer cladding of the fibre 17 as it enters the connector 10. A spring mechanism may be provided within the connector to provide controlled pressure on the end face of the ferrule 12 when a connection is made, to help control optical parameters, such as forward loss and return loss. The SC connector 10 includes an outer sleeve 16 diposed about the inner sleeve 14, and the two sleeves 14 and 16 are configured so as to allow the inner sleeve 14 to be retracted within the outer sleeve 16, as shown in FIG. 1, and then slid within the outer sleeve 16 so as to protrude therefrom when connecting to a through connector 18, as described hereinafter.

To make a connection between two fibres, two optical connectors are required, together with a through connector which is used to align the optical connectors so that the fibres are properly aligned and light is transmitted from one fibre to the other. A through connector includes an alignment sleeve which is a precision component used to align the ferrules 12 from the two optical connectors, and hence align the fibres of the ferrules 12. A securing mechanism is used to secure a through connector to an optical connector. The securing mechanism may take a number of forms, such as a screw thread arrangement, a bayonet arrangement or a push/pull arrangement. The SC connector 10 and a corresponding through connector 18 use a push/pull arrangement where the outer sleeve 16 is held and moved into an open end 20 of the through connector 18. Inside the connector 18 is included two arms disposed about the alignment sleeve which engage the inner sleeve 14 as the connector 10 is pushed into the through connector 18 so as to hold the inner sleeve 14 and connector 10 in position. The inner sleeve 14 includes latching portions which are engaged by the arms in the through connector 18 so as to form a snap fit with the through connector 18. The optical connector 10 can then not be removed from the through connector 18 by pulling on the fibre 17 or the boot 15 without damaging the optical connector 10. The connector 10 can only be safely removed from the through connector 18 by holding an exposed end of the outer sleeve 16 and pulling it away from the connector 18. The outer sleeve 16 includes tapered portions which, when pulled away from the through connector 18, force the arms of the through connector 18 away from the latching portions of the inner sleeve 14.

The securing mechanism between the optical connector 10 and the through connector 18 prevents accidental disconnection when the cable, fibre 17 or boot 15 at the back of the connector 10 is accidentally pulled. A similar facility to prevent accidental disconnection is provided by a number of connectors. A through connector which is used to connect two optical connectors of different types is referred to as a through adaptor, an inter-series adaptor, or an inter-series through adaptor. For example, the through connector 18 illustrated in FIG. 1 is a through adaptor for interconnecting an ST optical connector 22 and an SC optical connector 10.

Figure 2:
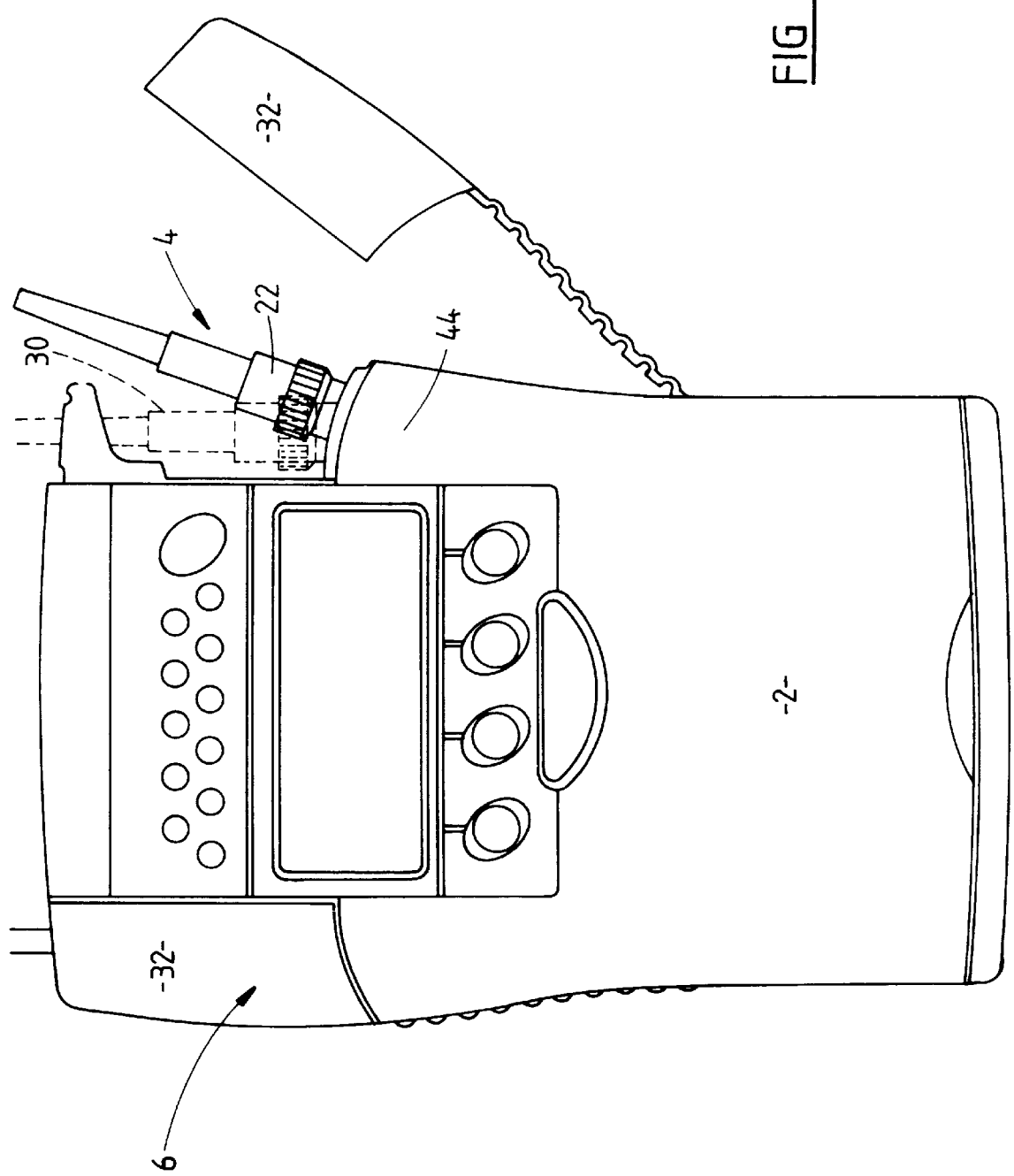
FIG. 2 is a plan view of the instrument.

The first preferred embodiment of the present invention provides an optical fibre instrument 2, as shown in FIGS. 2 to 7, which allows different through connectors to be attached thereto so that different types of optical connectors can be connected to the instrument 2. The instrument 2 includes two side bays 4 and 6 for receiving an optical connector 22, as shown in FIG. 2. The connector 22 is pivotable in the bay 4, as described hereinafter, and once connected can be moved into a home position 30 in the bay 4. The bay 4 and the connector 22 can then be enclosed and protected by a cover 32, as shown for the opposite bay 6. The optical connector 22 is connected to an SC connector 10 mounted within a pivotable support 40, as shown schematically in FIG. 1 and in more detail in FIGS. 3 to 9.

Figure 3:
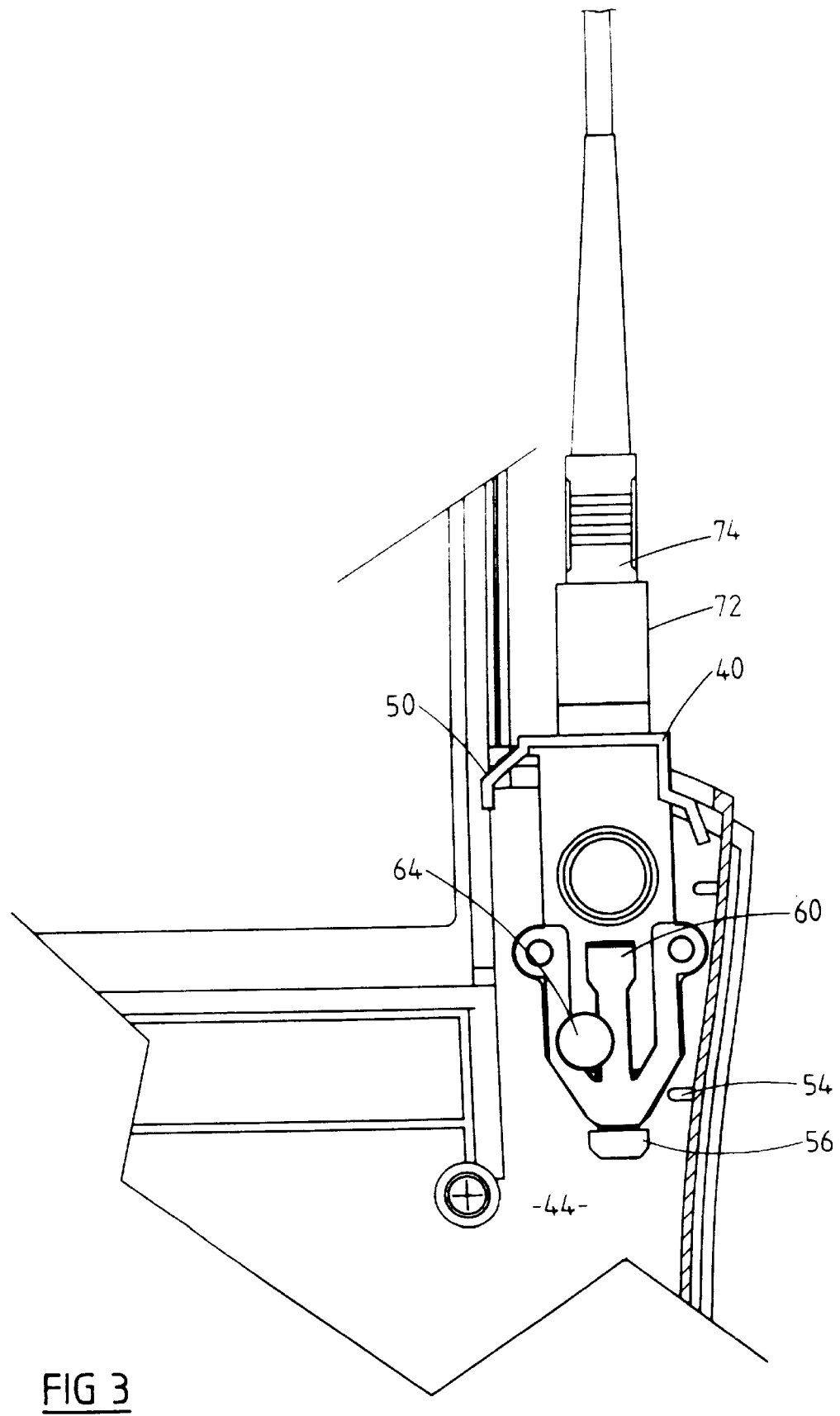
FIG. 3 is a plan partial cross-sectional view of a connecting bay of the instrument with the connector support in a home position, with a through connector and an optical connector.
Figure 4:
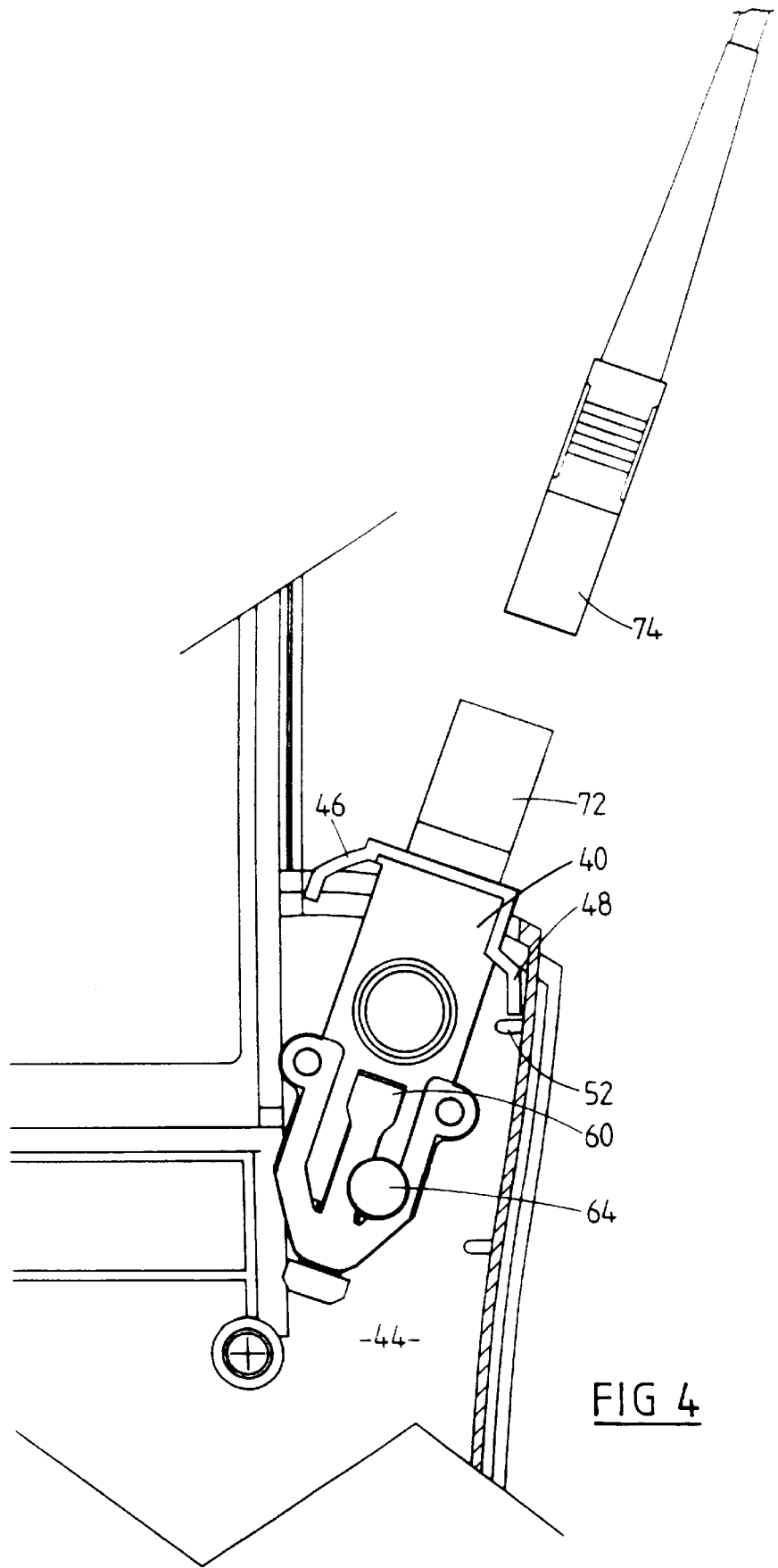
FIG. 4 is a plan partial cross-sectional view of a connecting bay of the instrument with the connector support in an open position, with a through connector, and an optical connector removed.
Figure 5:
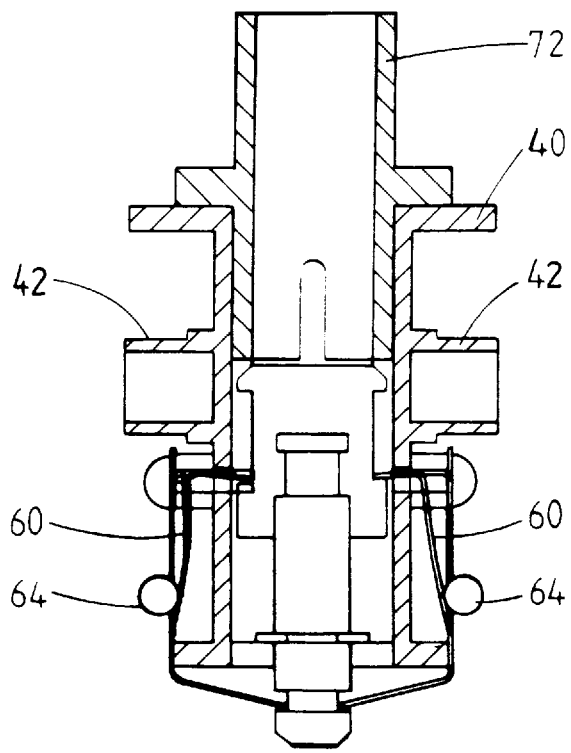
FIG. 5 is a side cross-sectional view of a connector support with a through connector.
Figure 6:
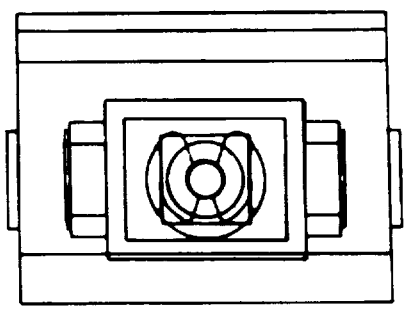
FIG. 6 is an upper partial cross-sectional view of the connector support with a through connector.
Figure 7:
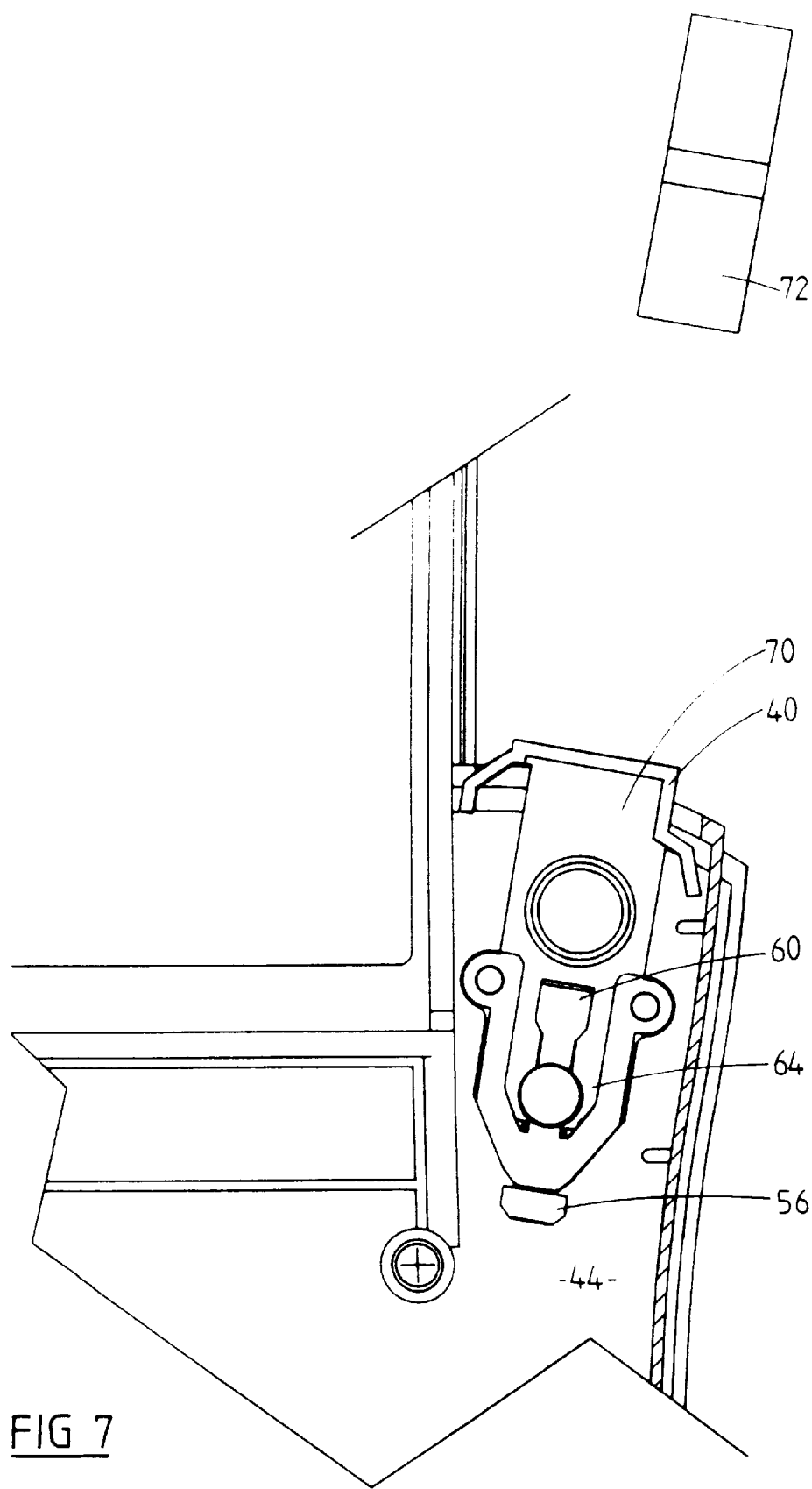
FIG. 7 is a plan partial cross-sectional view of a connecting bay of the inset with the connector support in a middle release position, with a through connector removed.

The pivotable support 40 includes spigots 42 which protrudes from each side of the support 40 and are received by a cooperating recesses in the body 44 of the instrument 2 so that the entire support 40 is pivotable about the axis of the spigots 42. The support 40 is pivotable in a bay 4 between a home position, as shown in FIG. 3, an open position, as shown in FIG. 4, and a middle release position, as shown in FIG. 7, which is between the home and open positions. The pivotal movement of the support 40 is restrained by upper flanges 46 and 48 engaging respective stops 50 and 52 of the body 44 of the instrument 2. The bottom of the support 40 also engages a stop 54 in te home position, as shown in FIG. 3. An SC connector 10 is held in place in the support 40 by a boss portion 56 located at the bottom of the support 40 which holds the boot 15 of the connector 10. The boss 56 is configured so as to allow some movement of the optical connector 10 if it or a connector connected to it is inadvertently pulled.

Figure 8:
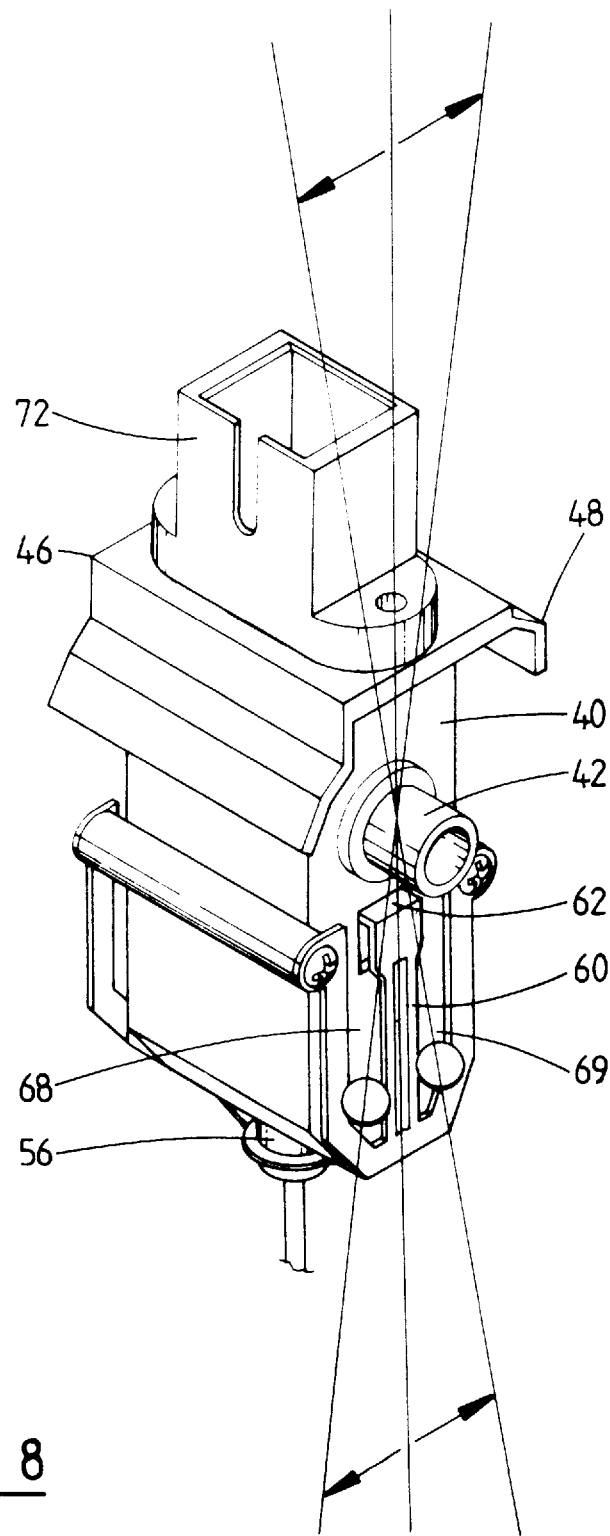
FIG. 8 is a schematic diagram of the connector support in the home or open positions with a through connector.
Figure 9:
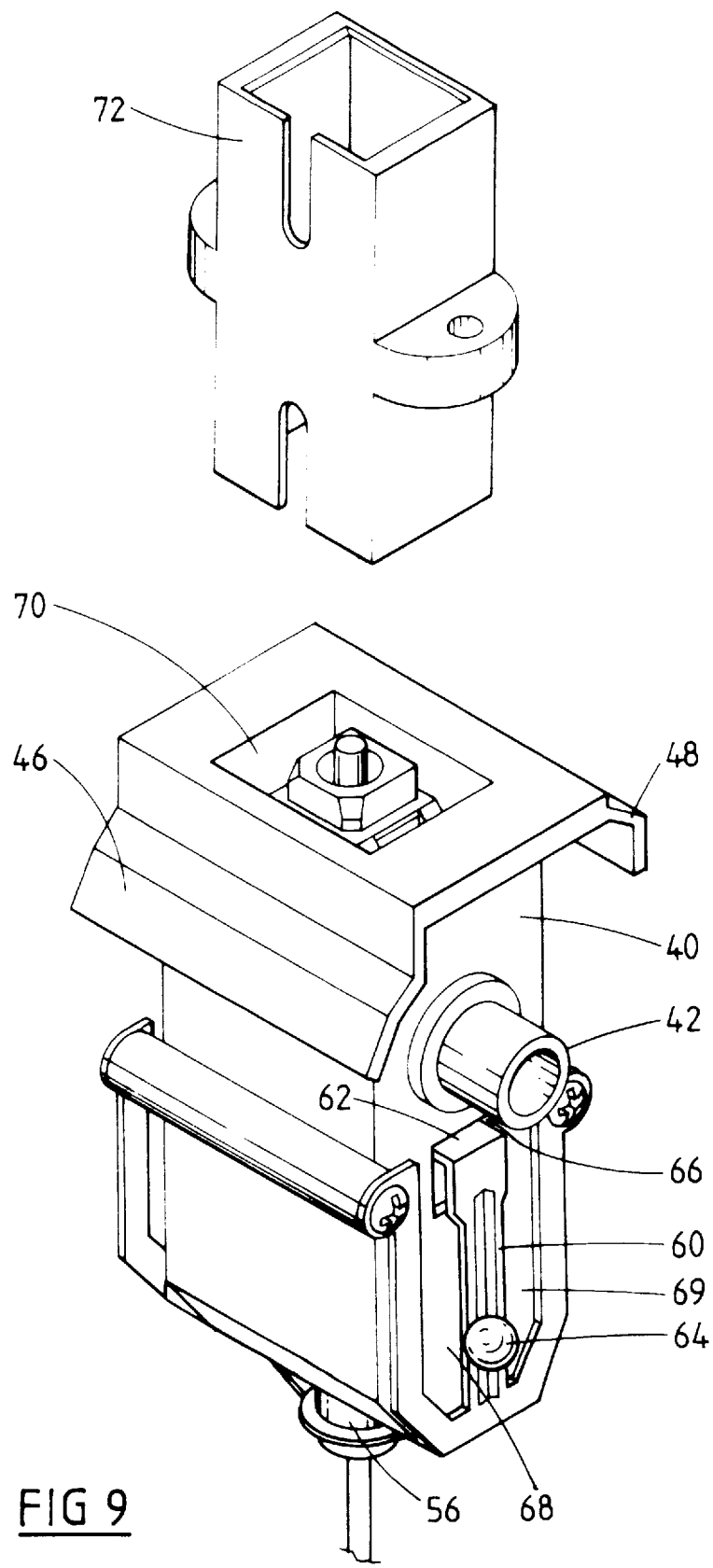
FIG. 9 is a schematic diagram of the connector support in the middle release position, with a through connector removed.

The support 40 includes, below each spigot 42, movable arms, or springs, 60. The arms 60 include inwardly extending portions 62 at each end thereof. The arms 60 are normally biased, as shown in FIGS. 3, 4 and 8, so that the extending portions 62 are free. However, when the support 40 is placed in the middle release position, as shown in FIGS. 7 and 9, ball bearings 64, which are housed in fixed opposite positions in the body 44, at against the arms 60 so as to press the extending portions 62 into corresponding holes 66 in the support 42 to engage and hold the outer sleeve 16 of the connector 10. The support 40 includes slits 68 and 69 disposed on opposite sides of the arm 60 so that in the home or open positions, the ball bearings 64 will reside in respective ones of the slits and allow the arms 60 to be normally biased away from the connector 10. In the home position, the ball bearings 64 will reside in the first slits 68, whereas in the open position the ball bearings 64 will reside in the second slits 69.

The support 40 includes a recess 70 at the upper end thereof which exposes the end of the optical connector 10 with the ferrule 12. The recess 70 allows a through connector 18,72 to be inserted therein and connected to the connector 10. Once the through connector 18,72 is connected to the connector 10 it cannot be removed from the instrument 2, unless the support 40 is placed in the middle release position, as shown in FIGS. 7 and 9. An optical connector 22,74 can then be connected to or removed from the instrument as desired, by inserting the connector 22,74 into or removing it from the through connector 18,72. The support 40 can be pivoted to the open position so as to facilitate connection and removal of an optical connector 22,74. Once connected, the optical connector 22,74 can be moved with the support 40 into the home position and protected by the cover 32.

If a different type of optical connector 22,74 needs to be placed in the bay 4 of the instrument 2, the support 40 is pivoted to the middle position so that the arms 60 engage the connector 10 disposed therein. The through connecter 18,72 can then be removed and replaced with an appropriate through connector 18,72 which facilitates connection of the desired type of connector.

The optical fibre connector system provided by the instrument 2 is particularly advantageous as it enables a variety of different types of optical connectors to be connected thereto by allowing different varieties of through connectors or adaptors to be inserted therein. The optical connector 10 housed in the support 40 of the instrument is a standard high performance and commonly available optical connector, which ensures a wide range of inexpensive th rough connectors of good performance are available to connect a variety of optical connector types. The instrument 2 supports all common single mode connectors, including physical contact and angled physical contact types, and also supports all common multimode connectors. The instrument 2 also supports custom ferrules for special purposes, e.g. a lens, fibre arrangement or optical device, such as a detector or emitter. For example, the following types are supported for the following manufacturers.

Single mode PC polish and multimode connectors:

| Manufacturer | | | Type | | |
|---|---|---|---|---|---|
| Diamond | LSA | FC | ST | E2000 | SC |
| Storm | | FC | ST | | SMA905/906 Mini BNC |
| Foxconn | | FC | ST | | SC |
| Molex | | | | | SC |
| AMP | | FC | ST | | SC |
| H & S NTTI | | FC | | | SC |

Figure 10:
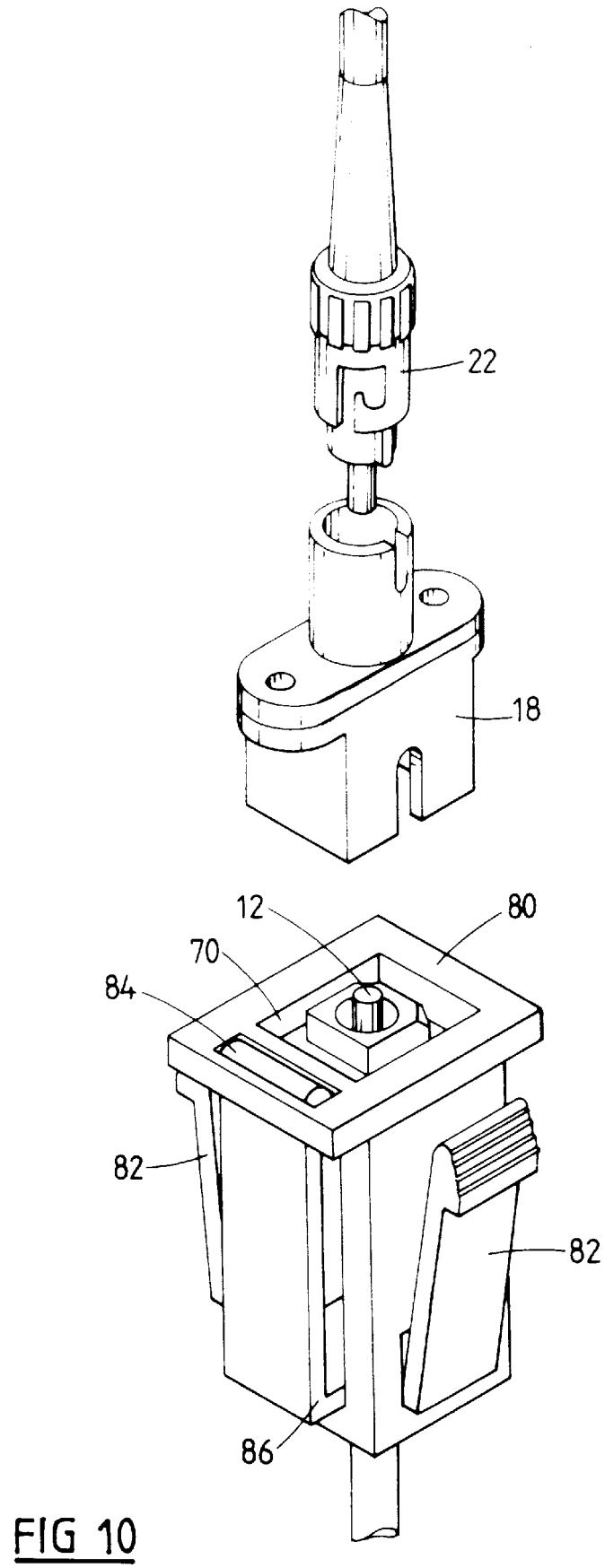
FIG. 10 is an exploded schematic view of a connector support of an instrument according to a second preferred embodiment, with a through connector and an optical connector.

Singlemode APC polish connectors:
Diamond LSA FC FC(JDS) SC
The provision of a pivoting support 40 also is advantageous as it improves access to users and provides ease of connection for fibres. The arrangement of the bays 4 and 6 and the covers 32 also provide a protected environment for the fibre connection.
Different mechanisms for releasing the through connector 18, 17 can be employed by the connector support 40. For example, a second connector support 80 is shown in FIG. 10 which instead of being pivotally mounted in the bays 4 and 6 of the instrument 2 is fixed in position by latching arms 82. The support 80 has a release button 84 disposed adjacent the recess 70 for be ferrule 12. Depressing the release button 84 causes an arm 86 of the support 80 to act on the bottom part of the optical connector 10 so as to hold the outer sleeve 16 in position so the through connector 18,72 can be removed replaced by another through connector.

Although the supports 40 and 80 are described as being incorporated in an instrument 2, they can be used in any form of optical fibre device or equipment, for example a modem or a wall or socket terminal.

Many modifications will be apparent to those skilled in the art without departing from the scope of the present invention as hereinbefore described with reference to the accompanying drawings.

I claim:

1. An optical fibre device, including an optical connector disposed therein, a recess allowing a through connector to be connected to said optical connector, and an engagement mechanism which is separate to and acts on part of said optical connector to enable said release of said through connector when connected to said optical connector.

2. An optical fibre device as claimed in claim 1, including a support part which includes said recess and holds at least part of said optical connector which includes a terminating part of an optical fibre.

3. An optical fibre device as claimed in claim 2, wherein the engagement mechanism includes at least one movable arm which is normally biased away from said optical connector, and is moved to engage said connector to enable said release of said through connector.

4. An optical fibre device as claimed in claim 3, wherein said support part is pivotal between at least first and second positions, the second position corresponding to a position where said release is enabled.

5. An optical fibre device as claimed in claim 4, wherein said movable arm is moved by a fixed part of said device which acts against said arm when said support part is pivoted between said positions.

6. An optical fibre device as claimed in claim 3, including a button arrangement to move said movable arm.

7. An optical fibre device as claimed in claim 5 or 6, wherein said optical connector is an SC optical connector.

8. An optical fibre connector system, including:
   a device with an optical connector disposed therein;
   a through connector connectable to said optical connector; and
   an engagement mechanism which is separate to and acts on part of said optical connector to enable said release of said through connector when connected to said optical connector.

9. An optical fibre connector system as claimed in claim 8, including a support part which includes said recess and holds at least part of said optical connector which includes a terminating part of an optical fibre.

10. An optical fibre connector system as claimed in claim 9, wherein the engagement mechanism includes at least one movable arm which is normally biased away from said optical connector, and is moved to engage said connector to enable said release of said through connector.

11. An optical fibre connector system as claimed in claim 10, wherein said support part is pivotal between at least first and second positions, the second position corresponding to a position where said release is enabled.

12. An optical fibre connector system as claimed in claim 11, wherein said movable arm is moved by a fixed part of said device which acts against said arm when said support part is pivoted between said positions.

13. An optical fibre connector system as claimed in claim 10, including a button arrangement to move said movable arm.

14. An optical fibre connector system as claimed in claim 12 or 13, wherein said optical connector is an SC optical connector.

* * * * *

UNITED STATES PATENT AND TRADEMARK OFFICE
CERTIFICATE OF CORRECTION

PATENT NO. : 5,887,100
DATED : March 23, 1999
INVENTOR(S) : Bruce Elphinston Robertson It is certified that error appears in the above-identified patent and that said Letters Patent is hereby corrected as shown below:

In column 1, line 26, delete the word "insets", and insert the word --instruments--

In column 2, line 2, delete the word "inset", and insert the word --instrument--

In column 3, line 45, delete the word "te", and insert the word --the--

In column 3, line 59, delete the word "at", and insert the word --act--

In column 4, line 33, delete the words "th rough", and insert word --through--

In column 5, line 5, delete the word "be", and insert the word --the--

Signed and Sealed this

Thirty-first Day of August, 1999

Attest:

Q. TODD DICKINSON

*Attesting Officer*          *Acting Commissioner of Patents and Trademarks*